United States Patent [19]

Caruthers, Jr.

[11] Patent Number: 4,797,553

[45] Date of Patent: Jan. 10, 1989

[54] METHOD AND APPARATUS FOR READING A TRANSPARENT PHOTOSTIMULABLE LUMINESCENT SCREEN

[75] Inventor: Edward B. Caruthers, Jr., Wilmington, Del.

[73] Assignee: E. I. DuPont de Nemours and Company, Wilmington, Del.

[21] Appl. No.: 48,650

[22] Filed: May 11, 1987

[51] Int. Cl.$^4$ ............................................. G01N 23.04
[52] U.S. Cl. .............................. 250/327.2; 250/484.1
[58] Field of Search ........................... 250/327.2, 484.1

[56] References Cited

U.S. PATENT DOCUMENTS

| | | | |
|---|---|---|---|
| 2,523,306 | 9/1950 | Kaiser et al. | 250/327.2 |
| 3,764,192 | 10/1973 | Wheeler | 350/6.6 |
| 3,859,527 | 1/1975 | Luckey | 250/327.2 |
| 3,975,637 | 8/1976 | Ikedo et al. | 250/327.2 |
| 4,256,364 | 3/1981 | Minoura et al. | 350/6.9 |
| 4,316,817 | 2/1982 | Cusano et al. | 252/301.18 |
| 4,527,060 | 7/1985 | Suzuki et al. | 250/327.2 |
| 4,543,479 | 9/1985 | Kato | 250/327.2 |
| 4,554,454 | 11/1985 | Taniguchi | 250/327.2 |
| 4,695,726 | 9/1987 | Watanabe et al. | 250/327.2 |

OTHER PUBLICATIONS

Marshall, G. F., *Laser Beam Scanning*, Marcel Dekker, Inc., New York, N.Y., 1985, pp. 193-236.

Primary Examiner—Janice A. Howell
Assistant Examiner—William F. Rauchholz

[57] ABSTRACT

A method and apparatus for interrogating a transparent photostimulable luminescent screen is characterized by positioning the screen with respect to a virtual point source of interrogating radiation such that the scanning interrogating radiation passes through the screen along the same paths as did the imaging beam.

5 Claims, 3 Drawing Sheets

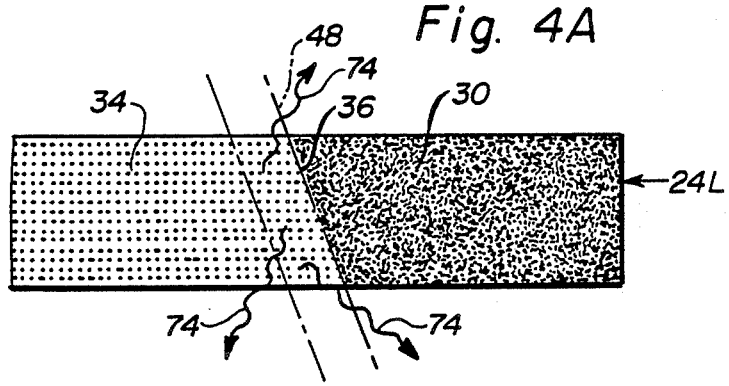
Fig. 4A
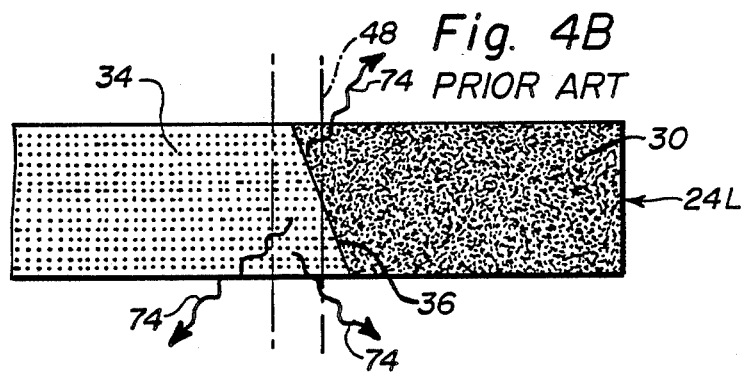
Fig. 4B
PRIOR ART
Fig. 5A
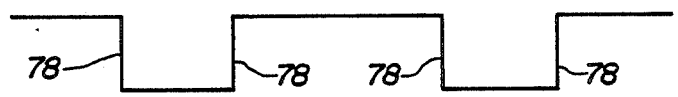
Fig. 5B
PRIOR ART
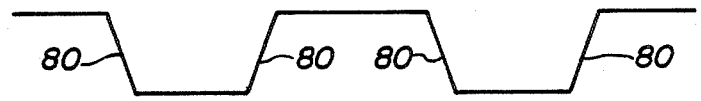

METHOD AND APPARATUS FOR READING A TRANSPARENT PHOTOSTIMULABLE LUMINESCENT SCREEN

FIELD OF THE INVENTION

This invention relates to a photostimulable luminescence imaging system and in particular to such a system that employs a transparent phosphor imaging screen.

DESCRIPTION OF THE PRIOR ART

An alternative to a traditional X-ray imaging system which employs silver halide film, usually together with an X-ray intensifying screen to capture an X-ray-generated image, is that known generally as a photostimulable luminescence (PSL) imaging system. Examples of a PSL system are disclose in U.S. Pat. No. 2,523,306 (Kaiser et al.) an U.S. Pat. No. 3,859,527 (Luckey). In accordance with the PSL technique an object to be examined is expose to an imaging beam comprised of high energy photons or high energy particles. The beam passes through the object an impinges upon an image storage screen having a stimulable phosphor therein. The intensity of the radiation impinging upon the various areas of the screen, an therefore the magnitude of the energy stored in those areas of the screen, is dependent upon the absorption of the imaging beam in corresponding areas of the object.

The latent image store in the screen is read by directing an interrogating beam at the screen. In the Kaiser et al. patent the entire surface of the phosphor screen is flooded with infrared radiation. A sheet of film is placed in contact with the phosphor screen to receive the visible light energy released from the phosphor. In the Luckey patent the interrogating beam is directed in a scanning pattern across the screen. The intensity of the visible light emitted from the screen as it is scanned by the interrogating beam contains the image information.

Representative of a suitable scanning arrangement for reading the screen is that disclosed in U.S. Pat. No. 4,527,060 (Suzuki et al.). This patent teaches scanning the screen in raster fashion by sweeping the interrogating beam along a line and transporting the screen past this line. The intensity variations of the emitted light are measured and signals representative thereof are electronically stored. A representation of the image may be displayed for subsequent examination and analysis using the stored signals.

The utility of a PSL system is dependent upon the resolution capabilities of the storage screen. A conventional PSL storage screen utilizes a thin layer of phosphor bound in polymer. Due to a mismatch in the indices of refraction of the phosphor and the polymer binder the conventional PSL screen has a high light scattering characteristic. A high light scattering characteristic limits the useful thickness of the phosphor layer. As the thickness of the phosphor layer is increased the spatial resolution of the image read from the screen is degraded. Such a conventional PSL screen is relatively easy to manufacture but suffers from limited spatial resolution of the image.

A PSL screen with a transparent layer of phosphor is available. Representative of such a transparent screen is that shown in U.S. Pat. No. 4,316,817 (Cusano et al.). "Transparent" in the present application is use to indicate that at least the interrogating radiation an possibly the photostimulated radiation produce in response thereto pass through the phosphor layer with little scattering. In such a transparent screen the phosphor layer may be made thicker than that in the conventional scattering screen without the associated degradation of spatial resolution. The thicker transparent screen offers the benefits of reduced noise an potentially improved image resloution and is therefore believed superior to the conventional PSL screen.

The image information is stored within the volume of the thicker transparent screen in a manner that is dependent upon the angle incidence of the imaging beam onto the screen. Therefore, to extract the image information from the transparent screen while preserving image resolution the manner in which the interrogating beam scans the screen must take into account the angular distribution of the stored image information in the transparent screen.

In view of the foregoing it is believed advantageous to provide an arrangement for interrogating a transparent imaging screen so as to most effieciently extract image information therefrom.

SUMMARY OF THE INVENTION

The present invention relates to a method of and an apparatus for interrogating a transparent phosphor screen. The image information is stored in the screen by positioning the screen at a predetermine location with respect both to a source of a high energy imaging beam and an object being examined. Due to the position of the screen with respect to the source of the imaging beam the imaging beam passes through the volume of the screen along predetermined paths such that the image information is stored in the phosphor of the screen and exhibits a predetermined angular distribution throughout the volume thereof. In the preferred case the imaging beam is produced by a high energy point source of imaging radiation such that the imaging beam passes through the screen along paths that extend radially from the point source.

In accordance with this invention the screen is positioned with respect to a source of a beam of interrogating radiation such that the interrogating beam passes through the volume of the screen along substantially the same paths as the imaging beam. The interrogating beam is scanned in a predetermined pattern across the screen.

In the preferred implementation the interrogating beam takes the form of a focussed laser beam. One or more scanning mirrors may be used for directing the interrogating beam along the interrogating pattern across the screen. The interrogating beam emanates from a point on the mirror (or on the last mirror if plural mirrors are used) that acts as a virtual point source of interrogating radiation. The virtual point source on the mirror (or on the last mirror if plural mirrors are used) is placed at a position and at a distance with respect to the screen corresponding to the position and distance occupied by the point source of imaging radiation with respect to the screen so that the interrogating beam passes through the volume of the screen along substantially the same paths as the imaging beam.

BRIEF DESCRIPTION OF THE DRAWINGS

The invention will be more fully understood from the following detailed description thereof taken in connection with the accompanying drawings, which form a part of this application, and in which:

FIG. 4A is an enlarged sectional view similar to a portion of FIG. 2 showing the interrogating beam at an instant in time and illustrating the relationship of the angle of the interrogating beam and the angular distribution of image information in the volume of the phosphor in the present invention, while FIG. 4B is a similar sectional view of that relationship in a prior art reading system; and FIGS. 5A and 5B are, respectively, electrical waveforms resulting from a system in accordance with the present invention and from a prior art reading system.

DETAILED DESCRIPTION OF THE INVENTION

Figure 1:
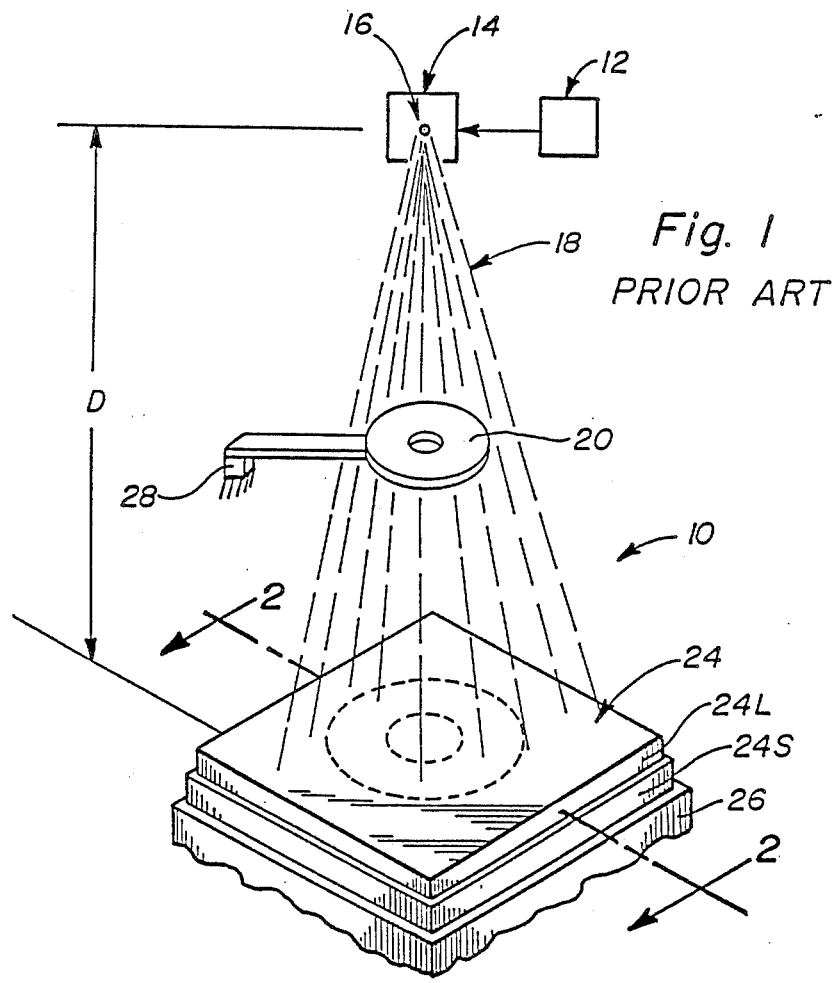
FIG. 1 is a stylized pictorial representation of an imaging station of a prior art photostimulated luminescence imaging system (PSL) of the type useful to store an image in a transparent PSL screen.

Throughout the following detailed description similar reference characters refer to similar elements in all figures of the drawings.

With reference to FIG. 1 shown is a stylized pictorial representation of an imaging station generally indicated by reference character 10 of a photostimulable luminescence (PSL) imaging system known in the art. The station 10 includes a high voltage power supply 12 connected to a X-ray tube 14. The tube 14 has a target which when excited electrically acts as a point source 16 of a cone-shaped beam 18 of high energy X-ray imaging radiation. Other sources of high energy imaging radiation may, of course, be used. It is recognized by those skilled in the art that the point source 16 is a small but finite area of the target 14. The area should be as small as possible.

The beam 18 is directed toward an object 20 being examined. A portion of the energy in the beam 18 is absorbed by the object 20. The remainder of the radiation falls upon and is absorbed by a transparent photostimulable luminescent phosphor screen 24. The screen 24 has a predetermined thickness associated therewith sufficient to provide the requisite absorption of the high energy imaging beam incident thereon. The transparent phosphor screen 24 is disposed at a predetermined location on a suitable support member 26 with respect both to the point source 16 and to the object 20. The object 20 may be supported by a support bracket 28 at any convenient location in the beam 18 between the target 16 and the phosphor screen 24. If desired the object 20 may be physically placed on the screen 24. The screen 24 is located a predetermined distance D from the point source 16 of imaging radiation. In medical radiographic applications the distance D is selected by the radiographer and is typically on the order of forty inches (for so-called "tabletop" work, e.g., arm, wrist) and seventy-two inches (for chest work). The distance D is the shortest distance between the point source 16 and the screen 24. The phosphor screen 24 is comprised of a suitable substrate 24S having a transparent phosphor layer 24L thereon. "Transparent" in this application is used to indicate that at least the interrogating radiation and possibly the photostimulated radiation produced in response thereto pass through the phosphor layer 24L with little scattering.

Any suitable material may be used in the phosphor layer 24L. For example, a europium-doped barium fluorochloride phosphor (BaFCl:Eu) bound in a polymer matrix may form the layer 24L. An example of such a screen is shown in U.S. Pat. No. 4,316,817 (Cusano et al.). Alternatively a europium-doped barium fluorochloridebromide phosphor may be used. The material used in the substrate 24S depends upon, among other things, the method to be employed to extract information from, or "read" the screen. If the screen is to be read in the transmission mode the substrate should be an optically transparent material such as polyethylene terephthalate. If the screen is to be read in the reflection mode the substrate material must be absorbing (nonreflective) to the stimulating radiation. It is desirable that the substrate reflect the stimulated radiation.

Figure 2:
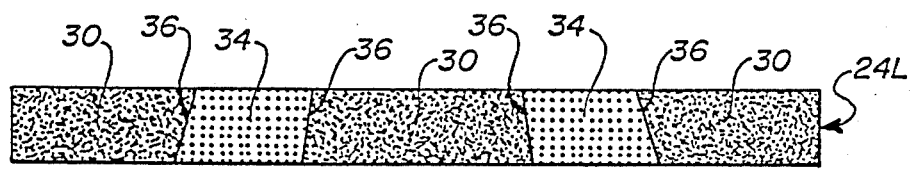
FIG. 2 is a sectional view taken along section lines 2—2 of FIG. 1 illustrating the angular distribution of image information stored in the phosphor layer of the screen shown in FIG. 1.

FIG. 2 is a side sectional view of the phosphor layer 24L of the screen 24. As is seen in FIG. 2 the high energy radiation incident on the screen 24 is absorbed to create a predetermined angular distribution of image information within the volume of the phosphor layer 24L. The volumes 30 of the phosphor layer 24L exposed to the full intensity of the imaging beam 18 are indicated by the heavy stippling. The volumes 34 of the phosphor layer 24L which are exposed to the attenuated intensity (due to absorption by the object 20) are illustrated by the light stippling. The location of the screen 24 with respect to the point source 16 results in the beam 18 passing through the object 20 and through the volume of the screen 24L along predetermined radial paths emanating from the point source 16. The boundaries 36 between the volumes 30 and 34 lie along these radial paths. By "angular distribution", as used in this application it is meant that the boundaries 36 lie along these radial paths.

Figure 3:
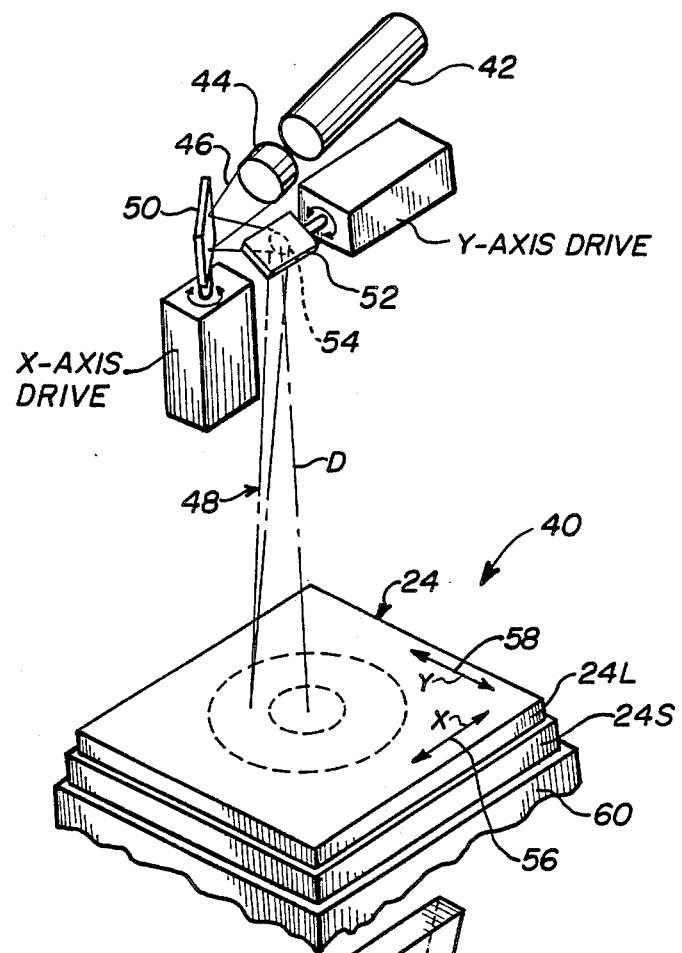
FIG. 3 is a stylized pictorial representation of an interrogating station in accordance with the present invention adapted to read the image information stored in the screen produced at the imaging station of FIG. 1.

FIG. 3 is a stylized pictorial representation of an interrogating station 40 embodying the teachings of and useful for practicing the method of the present invention to extract image information from the screen 24. The station 40 includes a source 42 of interrogating radiation, such as a helium neon laser, and associated beam forming optics 44. The elements 42 and 44 cooperate to produce a stationary beam 46 of suitable size, shape and divergence characteristics for interrogating the image information in the phosphor screen 24.

A beam 48 of interrogating radiation is caused to move along a predetermined scanning pattern across the screen 24 and the latent image of the object therein. The latent image of the object 20 in the phosphor layer 24L is shown in FIG. 3 by the dotted lines. A raster scanning pattern is preferred although it should be understood that any other suitable or convenient scanning pattern may be used.

The most preferred arrangement to produce a raster pattern is a drive arrangement such as that disclosed at page 215 of the text, *Laser Beam Scanning*, G. F. Marshall, Editor, Marcel Dekker, New York, New York, 1985. This text is hereby incorporated by reference herein. This drive arrangement is most preferred because its high scan speed makes it especially applicable to medical applications. Such a drive arrangement includes a first and a second galvanometer controlled mirror 50, 52, respectively. The interrogating beam 48 emanates from a virtual point source 54 on the second mirror 52. The mirrors 50, 52 are rotatable along their respective axes such that the interrogating beam 48 is caused to move across the screen 24 along X and Y axes, 56, 58, respectively. Suitable positive or negative lenses are incorporated within the beam forming optics 44 and are used to assure focus of the interrogating laser beam 48 in the plane of the PSL screen 24. Furthermore, suitable pre- or postobjective focus correction optics, such as that discussed at pages 227 and 228 of the abovereference text may be provided for the purpose of maintaining the focus of the interrogating beam 48 on the screen 24. By "virtual point source", as used throughout this application it is meant that the beam 48 of interrogating radiation appears to originate from a point in space which is in fact slightly displaced from the mirror 52.

It is well known in an arrangement such as that just discussed that movement of the first mirror 50 may cause small changes in the location on the second mirror 52 from which the interrogating beam emanates and that this may cause small distortions in the raster pattern produced on the screen. It is also well known that these distortions can be eliminated in various ways. For example, the variations may be eliminated by varying the drive currents to the galvanometers rotating the mirrors 50, 52. Alternately, the display scheme can use the actual raster pattern to relate photostimulated radiation to the true position at which the interrogating beam strikes the PSL screen. As a further alternative the distortion may be optically corrected as is disclosed in U.S. Pat. No. 4,256,364 (Minoura et al.).

Of course, it lies within the contemplation of this invention that any other convenient arrangement can be used to cause the interrogating beam to emanate from a virtual point source and to scan across the screen 24 in a predetermined pattern. For example, the last-cited patent to Minoura et al. discloses a gimbal mounted galvanometer scanning arrangement which produces a virtual point source of interrogating radiation. In this arrangement the galvanometer turns a single mirror about one axis and the gimbal turns the galvanometer about the second axis. In place of the galvanometer controlled mirror, the arrangement could be modified such that the gimbal holds a rotating polygon of the kind often used in one dimensional laser scanning.

Yet another alternate drive arrangement that may be used to produce a raster scanning pattern may be implemented using a kinematic orthogonal mirror mount such as that manufactured and sold by Newport Research Corporation of Fountain Valley, Calif., as model MM-2. The mount comprises two square plates, one of which serves as the support plate for the system and is attachable to a suitable mounting abutment. The other of the plates is movable with respect to the support plate and carries a planar mirror. The movable plate is mounted in a spring loaded fashion to the fixed support plate at three points of attachment, conveniently selected to lie at three of the four corners of the square movable plate. One of the attachment points serves as a pivot point for the movable plate and the mirror thereon such that application of a force at one of the other two attachment points causes the mirror to rotate about an axis defined between the pivot point and the remaining attachment point. Rotation of the mirror about one of the axes produces a displacement of the interrogating beam in one direction of the raster pattern while rotation of the mirror about the other axis produces displacement of the beam in the other direction of the raster pattern. Motorized drive screws or piezoelectric actuators may be used to apply the forces to the movable plate. It is believed that this drive arrangement is not appropriate for medical applications because of its extended scan time. However, scan time may be improved if the motorized drive screws or piezoelectric actuators are replaced by a cam drive as disclosed in U.S. Pat. No. 3,764,192 (Wheeler).

By whatever arrangement selected the drive produces a beam 48 of interrogating radiation emanating from a virtual point source 54 that is caused to sweep in a predetermined pattern, preferably a raster pattern, across the screen 24.

As will be discussed more fully herein, in accordance with the present invention the station 40 includes a support plate 60 for supporting the screen 24 in a position with respect to the virtual point source 54 of the interrogating beam 48 such that the interrogating beam 48 passes through the volume of the screen 24 along substantially the same paths as the imaging beam 18 (FIGS. 1 and 2). The virtual point source 54 lies the same distance D from the screen 24 as did the point source 16 of imaging radiation.

A light collector assembly 64 collects the light emitted from the screen 24 and directs it toward a photodetector 66. The light collector assembly 64 may be movable or fixed with respect to the screen 24, as appropriate or as desired. The light collector assembly 64 may also be positioned in what is commonly known as the "reflection" mode above the screen 24 to enhance the collection of the emitted light, as is well known in the art. Additionally, or alternatively, the light collector assembly may be positioned in what is commonly referred to as the "transmission" mode below the screen 24. The collector assembly 64 is positioned in the transmission mode in FIG. 3. Suitable for use as the photodetector 66 is a photomuitiplier tube although any other photodetector may be used.

The electrical signal output of the photodetector 66 is carried by a line 68 to a suitable storage element 70. A filter element 72 is interposed between the end of the light collector assembly 64 and the photodetector 66 to permit only photostimulated light emitted from the screen lying within a predetermined wavelength range to reach the photodetector 66.

In accordance with the present invention the screen 24 is positioned in the interrogating station 40 at the same relative position with respect to the virtual point source 54 of interrogating radiation as the position occupied by the screen 24 with respect to the point source 16 of imaging radiation 18. That is, the screen 24 lies the same distance D from the virtual point source 54 (FIG. 3) of interrogating radiation as it did from the point source 16 of imaging radiation. As a result the beam 48 of the interrogating radiation passes along substantially the same paths through the volume of the phosphor layer 24L of the screen 24 as did the imaging beam 18. This situation is illustrated in connection with FIGS. 4A and 4B. It should be understood that the magnitude of the distance D may be any distance selected as appropriate. The important point to note is that the distances D in the imaging station (FIG. 1) and in the interrogating station (FIG. 3) are the same.

As is seen in FIG. 4A the interrogating beam 48 is shown at the instant in time when the volume of the phosphor layer 24L of the screen 24 adjacent to an image boundary 36 is being interrogated. Because of the position of the screen 24 with respect to the virtual point source 54 of the interrogating radiation the interrogating beam 48 follows substantially the path along the boundary 36 and thus stimulates only a volume of the phosphor layer 24L through which an attenuated portion of the imaging beam 18 had passed. The photostimulated radiation generated by the passage of the interrogating beam 48 is indicated by the reference character 74.

In contrast, as seen in FIG. 4B, in the prior art the screen is positioned such that the interrogating beam does not follow the same path through the volume of the phosphor layer of the screen as the path followed by the imaging beam. Thus the interrogating beam passes both through a volume of the phosphor layer that has been exposed to the attenuated portion of the imaging beam and as well through a volume that has been exposed to an unattenuated portion of the imaging beam.

The advantage of the present invention over the prior art may be best understood with reference to FIGS. 5A and 5B which are, respectively, representative electrical signals output from the photodetector 66 on the line 68 corresponding to an interrogation of a screen in accordance with the present invention and an interrogation of the screen in accordance with the prior art. As seen in FIG. 5A the transitions 78 in signal level corresponding to passage of the interrogating beam across the boundaries 36 in the phosphor layer 24L of the screen 24 have short rise and short fall times. In contrast, as seen in FIG. 5B, the transitions 80 of the signal developed by an interrogation of the phosphor layer in accordance with the prior art have relatively longer rise and fall times. The relatively longer rise and fall times of signals produced by the prior art result in blurring of the boundaries 36 and thus in loss of spatial resolution in the extracted, and later reproduced, image. This loss in spatial resolution limits the amount of fine detail extracted from the stored image of the object.

In view of the foregoing it may thus be seen that so long as the screen is located in the same position relative to a virtual point source of interrogating radiation as that occupied by the screen with respect to a virtual point source of an imaging beam of radiation then the interrogating radiation will pass through the volume of the phosphor layer of the screen along substantially the same paths as did the imaging radiation.

Those skilled in the art, having benefits of the teachings of the present invention as hereinabove set forth may effect numerous modifications thereto. These modifications are to be construed as lying within the scope of the present invention as defined by the appended claims.

What is claimed is:

1. A method for interrogating a transparent phosphor screen in which image information has been stored by positioning the screen at a predetermined location with respect both to a source of a high energy imaging beam and an object being examined so that the imaging beam passes through the volume of the screen along predetermined paths to create a predetermined angular distribution of image information within the volume of the phosphor, comprising the steps of:

positioning the screen with respect to a source of a beam of interrogating radiation such that the interrogating beam passes through the volume of the screen along substantially the same paths as the imaging beam; and scanning the beam of interrogating radiation in a predetermined pattern across the screen.

2. A method for interrogating a transparent phosphor screen in which image information has been stored by positioning the screen at a predetermined location with respect both to a point source of a high energy X-ray imaging beam and an object being examined so that the imaging beam passes through the volume of the screen along predetermined paths emanating radially from the point source to create a predetermined angular distribution of image information within the volume of the phosphor comprising the steps of:

positioning the screen with respect to a virtual point source of a beam of interrogating radiation such that the interrogating beam passes through the volume of the screen along substantially the same paths as the imaging beam; and scanning the beam of interrogating radiation in a predetermined pattern across the screen.

3. The method of claim 2 wherein the interrogating beam takes the form of a focussed laser beam and the scanning of the beam along the interrogating pattern is effected by at least one mirror placed at a position with respect to the screen such that the virtual point source of interrogating radiation lies at substantially the same distance from the screen as did the point source of imaging radiation.

4. Apparatus for interrogating a transparent phosphor screen in which image information has been stored by positioning the screen in a predetermined location with respect to a beam of high energy imaging radiation so that the imaging beam passes through the volume of the screen along predetermined paths, the apparatus being of the type having a plate for supporting the transparent screen, and
means for producing a beam of interrogating radiation and for scanning the interrogating beam in a predetermined pattern over the screen, wherein the improvement comprises:

the plate and the scanning means being located with respect to each other such that the screen occupies substantially the same position with respect to the interrogating beam as the position occupied by the screen with respect to the imaging beam so that the interrogating beam of radiation passes through the volume of the screen along substantially the same paths as the imaging beam.

5. The apparatus of claim 4 wherein the imaging beam emanates from a point source and wherein the interrogating beam emanates from a virtual point source, and wherein the improvement further comprises the screen lying substantially the same distance from the virtual point source of the interrogating beam as the distance between the screen and the point source of the imaging beam.

* * * * *